Patented Nov. 8, 1927.

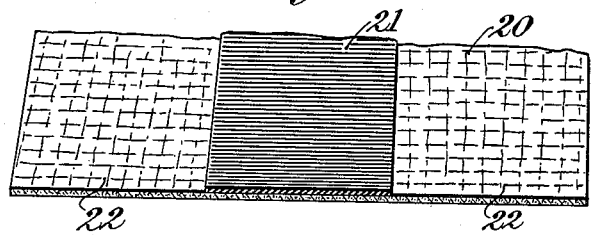
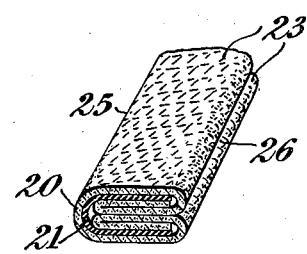
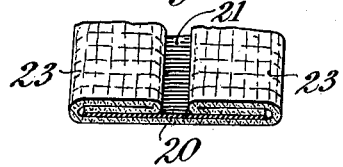
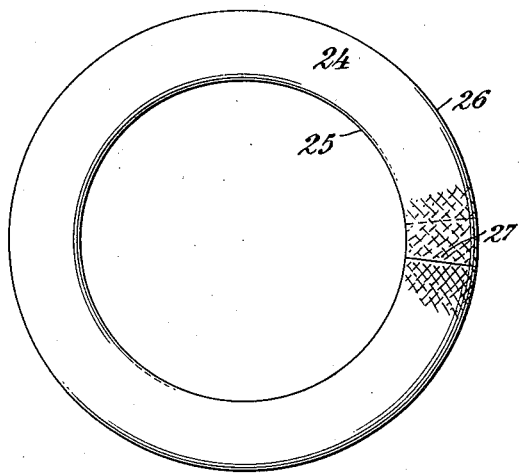
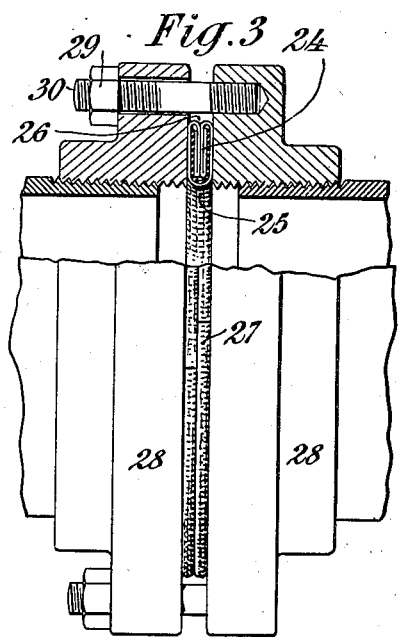
INVENTOR:
Winfield O. Farrington,
By Attorneys,
Fraser, Myers & Manley.

1,648,391

UNITED STATES PATENT OFFICE.

WINFIELD O. FARRINGTON, OF LOS ANGELES, CALIFORNIA, ASSIGNOR TO THE GARLOCK PACKING COMPANY, OF PALMYRA, NEW YORK, A CORPORATION OF NEW YORK.

PACKING.

Application filed June 19, 1925. Serial No. 38,272.

This invention relates to improvements in gaskets and in packing material adapted for use in the making of gaskets.

Gaskets and packing material embodying the invention herein disclosed and claimed are intended for general application and are peculiarly suited for heavy service involving the resistance of gases or other fluids at varying degrees of temperature and pressure. Such packing material has been found to give excellent service when used as gaskets in absorption towers and Sweetland presses employed in the refining of oils.

It is an object of the invention to provide a packing of more or less general applicability and particularly adapted for use in the making of gaskets which shall be relatively simple and economical in construction but highly durable and efficient in service.

In the drawings illustrating the preferred form of the invention,—

Figure 1 is a perspective view of a short length of packing embodying the invention herein sought to be protected.

Fig. 2 is a side view of a gasket made from packing of the character illustrated in Fig. 1.

Fig. 3 is a view, partly in side elevation and partly in section, of a pair of flanged fittings the joint between which is packed by means of a gasket such as that illustrated in Fig. 2.

Fig. 4 is a perspective view illustrating a pair of blanks of material superposed one upon another as the first step in the preparation of the packing illustrated in Fig. 1.

Fig. 5 is a perspective view illustrating a second step in the making of the packing.

Fig. 6 illustrates the parts from which the packing is made at the end of a third step, after which, as a result of a fourth step, the completed packing illustrated in Fig. 1 is produced.

Referring first to Figs. 1, 4, 5 and 6, the packing embodying the invention under consideration comprises a plurality of tapes herein disclosed as two tapes 20, 21. The tape 20 serves as an enveloping material within which the tape 21 is completely enclosed. The tape 20 should preferably be constructed of material adapted to exert friction when compressed between surfaces to be packed. It should preferably be of a high degree of durability, adapted to resist high temperatures, and relatively inert to the action of the gases or fluids to which it is subjected. An appropriate material for such purpose is a fabric of asbestos fibre which may preferably be reinforced by relatively fine strands of wire, such material being well known in the art.

The tape 21 should be of a relatively impervious oil and gas resistant material such, for example, as lead or other soft metal or, preferably, of oil resistant rubber composition. Such material is also well known in the art.

In its broadest aspect, the packing of this invention comprises superimposed tapes of material of the above-described character folded lengthwise, with the tape of fibrous material outermost, and gaskets may be formed from such packing by bending the same to the desired curved form, with the folded edge innermost.

In its more specific form preliminary foldings of the edges of the tape of fibrous material may first be made in order to avoid exposure of any raw edges in the finished product.

The packing embodying the invention in its preferred form may be constructed by superposing the tape 21 upon the tape 20, as indicated in Fig. 4; folding the edge portions 22 of tape 20 upon themselves to form double edge portions 23, as indicated in Fig. 5; folding these double edge portions 23 inwardly onto the exposed surface of tape 21, as indicated in Fig. 6; and, finally, folding the combined structure along a medial line so as to bring the portions 23 in contact with each other to produce the packing illustrated in Fig. 1.

For best results the contacting surfaces of the tapes from which the packing is constructed will be secured together by appropriate fastening means, preferably by the application of rubber cement applied during the folding operations.

In commercial practice the folding and securing together of the component elements from which the packing is formed will be accomplished by means of suitable machinery, which forms no part of the invention herein disclosed and claimed.

In the making of a gasket 24 from the packing illustrated in Fig. 1, the material will be so curved that the margin 25 having a single fold will be disposed inwardly and the margin 26 having a double fold will be disposed outwardly, as indicated in the gasket shown in side view in Fig. 2. The ends of the gasket may be united in any suitable manner as, for example, by means of the offset joint 27 clearly indicated in Figs. 2 and 3 of the drawings.

The adjacent surfaces of the packing as well as those of the gasket formed thereof may be brought into intimate contact by the application of any desired degree of pressure.

One application of a gasket made from packing embodying the invention is illustrated in Fig. 3, which discloses a pair of flanged fittings 28 between which the gasket 24 is compressed by the drawing up of nuts 29 on stud bolts 30 to pack the joints between the fittings. It will be apparent that the single fold 25 is so disposed as to be directly opposed to the oil, gas, or other fluid confined within the apparatus of which the packed joint forms a part, and the permeation of such fluids through the joint is arrested by this unbroken surface reinforced by the enclosed oil resistant rubber insert.

The invention is not intended to be limited to the specific form herein selected for purposes of illustration, but may be varied or modified within the scope of the appended claims.

What is claimed is:—

1. A packing comprising tapes of asbestos fabric and of oil resistant rubber, respectively, superimposed and folded longitudinally with a layer of the fabric tape outermost.

2. A packing, as defined by claim 1, having its contacting surfaces secured together by appropriate fastening means.

3. A packing comprising a relatively wide tape of fibrous material, and a narrower tape of relatively impervious material, the latter being superimposed upon the former, the longitudinal edge portions forming the excess width of the former being folded over the edges of the latter and the superimposed tapes being folded longitudinally along a median line with the tape of fibrous material outermost.

4. A packing, as defined by claim 3, in which asbestos fibre is used as the body material of the wider tape.

5. A packing, as defined by claim 3, in which an oil resistant rubber is used as the material of the narrower tape.

6. A packing comprising a relatively wide tape of fibrous material and a narrower tape of relatively impervious material, the latter being superimposed upon the former, the longitudinal edge portions forming the excess width of the former being folded upon themselves and such folded portions folded over the edges of the latter, and the superimposed tapes being folded longitudinally along a median line with the tape of fibrous material outermost.

7. A gasket comprising tapes of asbestos fabric and of oil resistant rubber, respectively, superimposed and folded longitudinally with a layer of the fabric tape outermost, the contacting surfaces being secured together by appropriate fastening means, and the superimposed tapes being bent to the desired curved form with a margin presenting a single fold directed innermost.

8. A gasket comprising a relatively wide tape of fibrous material and a narrower tape of relatively impervious material, the latter being superimposed upon the former, the longitudinal edge portions forming the excess width of the former being folded over the edges of the latter, the superimposed tapes being folded longitudinally along a median line with the tape of fibrous material outermost, the contacting surfaces being secured together by appropriate fastening means, and the combined structure bent to the desired curved form with the margin presenting a single fold directed innermost.

9. A gasket comprising a relatively wide tape of fibrous material and a narrower tape of relatively impervious material, the latter being superimposed upon the former, the longitudinal edge portions forming the excess width of the former being folded upon themselves and such folded portions folded over the edges of the latter, the superimposed tapes being folded longitudinally along a median line with the tape of fibrous material outermost, the contacting surfaces being secured together by appropriate fastening means, and the combined structure bent to the desired curved form with the margin presenting a single fold directed innermost.

10. A packing comprising a strip of relatively impervious material, folded longitudinally to form two layers, and a strip of fibrous material enveloping said impervious strip, the latter strip having edge portions turned over the free edges of the former and extended inwardly between the layers thereof.

11. A packing comprising a strip of relatively impervious material, folded longitudinally to form two layers, and a strip of fibrous material enveloping said impervious strip, the latter strip having portions turned over the edges of the former and having folded edge portions extended inwardly between the layers thereof.

In witness whereof, I have hereunto signed my name.

WINFIELD O. FARRINGTON.